United States Patent [19]
Hirata et al.

[11] Patent Number: 5,115,410
[45] Date of Patent: May 19, 1992

[54] PROGRAM PROCESSING SYSTEM HAVING STANDARD PROGRAM FOR PROCESSING OPTIONALLY POST-STORED PROGRAMS

[75] Inventors: Keiichi Hirata, Kuwana; Yoshinari Morimoto; Minoru Ooishi, both of Nagoya; Tomohiro Ban, Iwakura; Akihiro Furukawa, Nagoya, all of Japan

[73] Assignee: Brother Kogyo Kabushiki Kaisha, Aichi, Japan

[21] Appl. No.: 228,222

[22] Filed: Aug. 4, 1988

[30] Foreign Application Priority Data

Aug. 10, 1987 [JP] Japan .............................. 62-200531

[51] Int. Cl.⁵ ........................ G06F 9/00; G06F 13/00
[52] U.S. Cl. ................................ 395/650; 364/295.6; 364/943.43; 364/DIG. 1; 364/DIG. 2
[58] Field of Search ... 364/200 MS File, 900 MS File

[56] References Cited

U.S. PATENT DOCUMENTS

| | | | |
|---|---|---|---|
| 4,145,742 | 3/1979 | Olander, Jr. et al. | 364/709 |
| 4,366,553 | 12/1982 | Spangler et al. | 364/900 |
| 4,459,049 | 7/1984 | Howell et al. | 400/98 |
| 4,651,300 | 3/1989 | Suzuki et al. | 364/900 |
| 4,671,684 | 6/1987 | Kojima et al. | 400/63 |
| 4,689,768 | 8/1987 | Heard et al. | 364/900 |
| 4,805,136 | 2/1989 | Marino et al. | 364/900 |
| 4,947,315 | 8/1990 | Sokolow et al. | 364/200 |

FOREIGN PATENT DOCUMENTS 0076950 4/1983 European Pat. Off. .
58-123128 7/1983 Japan .
58-182734 10/1983 Japan .

OTHER PUBLICATIONS

IBM Technical Disclosure Bulletin. vol. 30, No. 3, Aug. 1987, pp. 1115-1116.
IBM Technical Disclosure Bulletin, vol. 28, No. 8, Jan. 1986, pp. 3315-3316.

Primary Examiner—Thomas C. Lee
Assistant Examiner—Ayni Mohamed
Attorney, Agent, or Firm—Oliff & Berridge

[57] ABSTRACT

A program processing system including a program input device for entering optional programs for performing an optional function, an optional-program memory for storing the optional programs, a standard-program memory which stores a standard program for performing a basic function; a commanding device for designating one of the optional programs, for execution of the designated optional program, and a controller for retrieving the designated optional program from the optional-program memory, to perform the corresponding optional function, if the designated optional program is stored in the optional-program memory, the control means retrieving the standard program from the standard-program memory, to perform the basic function, if the designated optional program is not stored in the optional-program memory means.

9 Claims, 3 Drawing Sheets

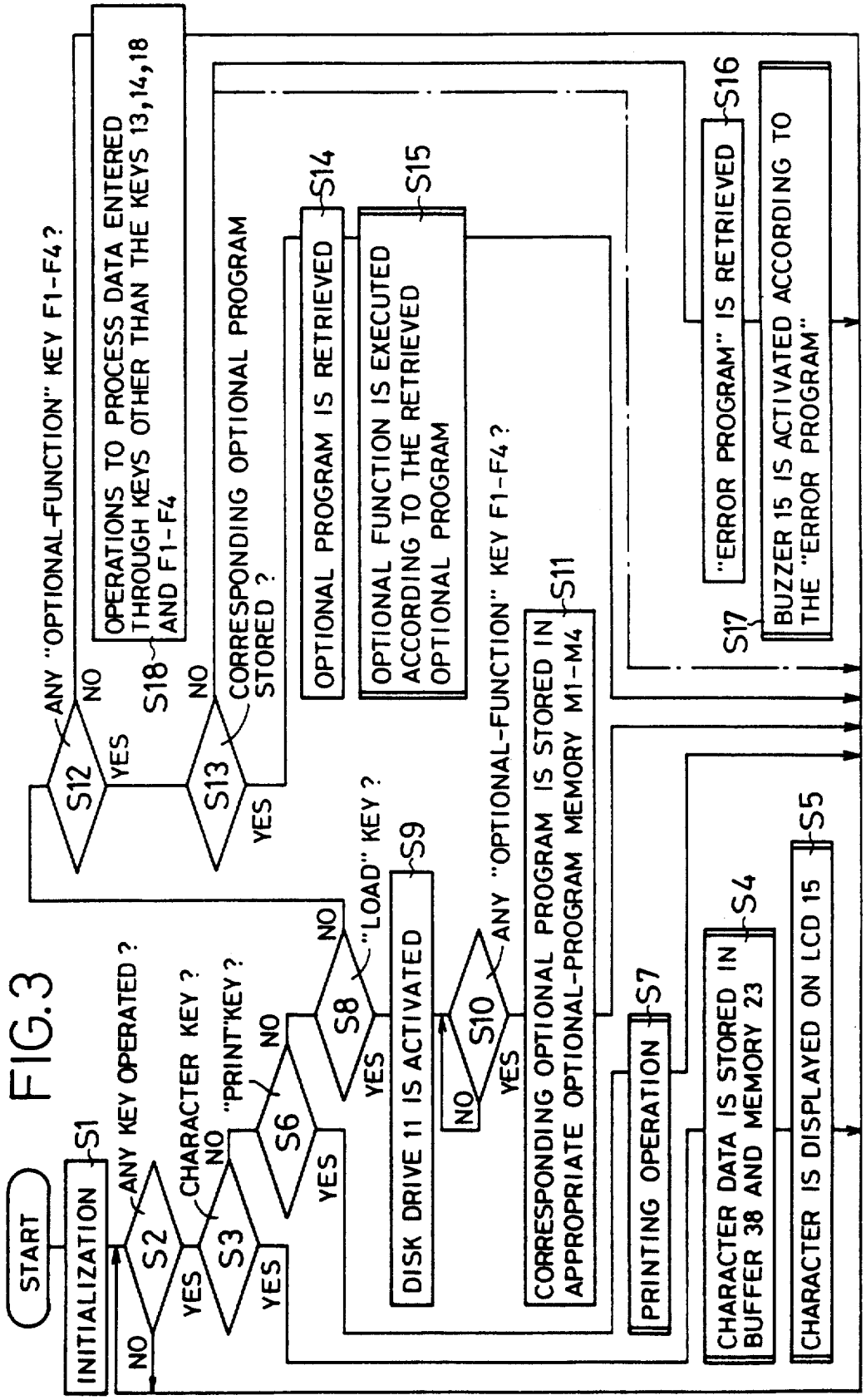

PROGRAM PROCESSING SYSTEM HAVING STANDARD PROGRAM FOR PROCESSING OPTIONALLY POST-STORED PROGRAMS

BACKGROUND OF THE INVENTION

1. Field of the Invention

The present invention relates in general to a data processing apparatus such as a word processor and an electronic typewriter, and more particularly to a program processing system for dealing with control programs for performing various data processing functions.

2. Discussion of the Prior Art

A known word processor, electronic typewriter or similar data processing apparatus can be temporarily loaded with optional or auxiliary programs for optional or special functions such as a word search or spell checking of entered text data, which are not offered by a standard control program provided as a standard or basic feature of the apparatus. These optionally provided programs are implemented, independently of the standard control program which is adapted to perform various basic data processing functions.

Described more specifically, when it is desired to perform an optional or special function during a data entry or processing operation, the control flow of the standard control program is once terminated, and then a suitable storage medium such as a PC board, module package or floppy disk storing an optional program is set in a data loading device provided on the apparatus, so that the optional program is executed such that the control flow of the optional program is independent of the control flow of the standard control program. After an operation to effect the relevant optional function according to the optional program is completed, the control should be restored to the standard control program to continue the data entry or processing operation.

Thus, the known program processing system deals with the optional programs independently of the main control program. In other words, the system and the standard program are not adapted to accept the optional programs so that the optional programs may be executed as if the optional programs were part of the standard program or as if they were originally provided on the apparatus.

SUMMARY OF THE INVENTION

It is therefore an object of the present invention to provide a program processing system for a data processing apparatus such as a word processor or electronic typewriter, which system permits the user to expand the data processing capability of the apparatus, by adding desired optional programs as if these optional programs were part of a standard control program that is provided as a standard feature of the apparatus for performing various basic data processing functions.

The above object may be attained according to the principle of the present invention, which provides a program processing system, comprising: program input means for entering at least one optional program for performing an optional function; optional-program memory means for storing the at least one optional program entered through the program input means; standard-program memory means which stores a standard program for performing a basic function; commanding means for designating one of the at least one optional program, for execution of the designated optional program; and control means connected to the optional-program memory means, the standard-program memory means and the commanding means. The control means is adapted to retrieve the designated optional program from the optional-program memory means, to perform the corresponding optional function, if the designated optional program is stored in the optional-program memory means. If the designated optional program is not stored in the optional-program memory means, the control means retrieves the standard program from the standard-program memory means, to perform the basic function.

In the program processing system of the present invention, an optional program or programs for a desired optional function or functions may be stored in the optional-program memory means, through the program input means. When the selected optional program stored in the optional-program memory means is designated by the commanding means, the control means retrieves the designated optional program from the optional-program memory means, and implements the corresponding optional function, according to the retrieved optional program.

If the optional program designated by the commanding means is not stored in the optional-program memory means, the control means retrieves the standard program from the standard-program memory means, and performs the basic function according to the retrieved standard program.

It will be understood that if the instant program processing system is incorporated in a data processing apparatus such as a word processor and an electronic typewriter, the apparatus can be easily functionally expanded by optional programs for desired optional functions, in addition to the standard program for various basic data processing functions. The added optional programs may be executed as if they were part of the standard program, namely, as if the optional programs are provided as a standard or basic feature.

The basic function performed by the execution of the standard program may comprise an alarm function of informing an operator of the system that the designated optional program has not been stored in the optional-program memory means. In this case, the system may further comprise a buzzer, and the alarm function is performed by activating the buzzer.

Alternatively, the basic function performed by the execution of the standard program may comprise a function of returning a control flow of the control means to a state in which the control means awaits a next command.

The program input means may comprise a disk drive for reading the at least one optional program stored on a storage disk.

The optional-program memory means may comprise a plurality of optional-program memories for storing a plurality of optional programs for different optional functions. In this case, the commanding means comprises a plurality of key switches which are selectively operated to designate the plurality of optional programs, respectively.

Another object of the invention is to provide an apparatus for preparing a text of a document, which incorporates a program processing system which permits the apparatus to be readily functionally expanded by optional programs.

The above object may be achieved according to another aspect of the present invention, which provides an apparatus for preparing a text, comprising a program processing system which has been described above, a keyboard having a multiplicity of character and function keys, a text memory for storing text data comprising character and function data entered through the keyboard, and display means for displaying the text data. In this instance, the above-indicated at least one optional program may include a program for searching for a designated group of characters in the text data stored in the text memory.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which:

FIG. 3 is a flow chart showing a main routine executed by the apparatus.

DETAILED DESCRIPTION OF THE PREFERRED EMBODIMENTS

Figure 1:
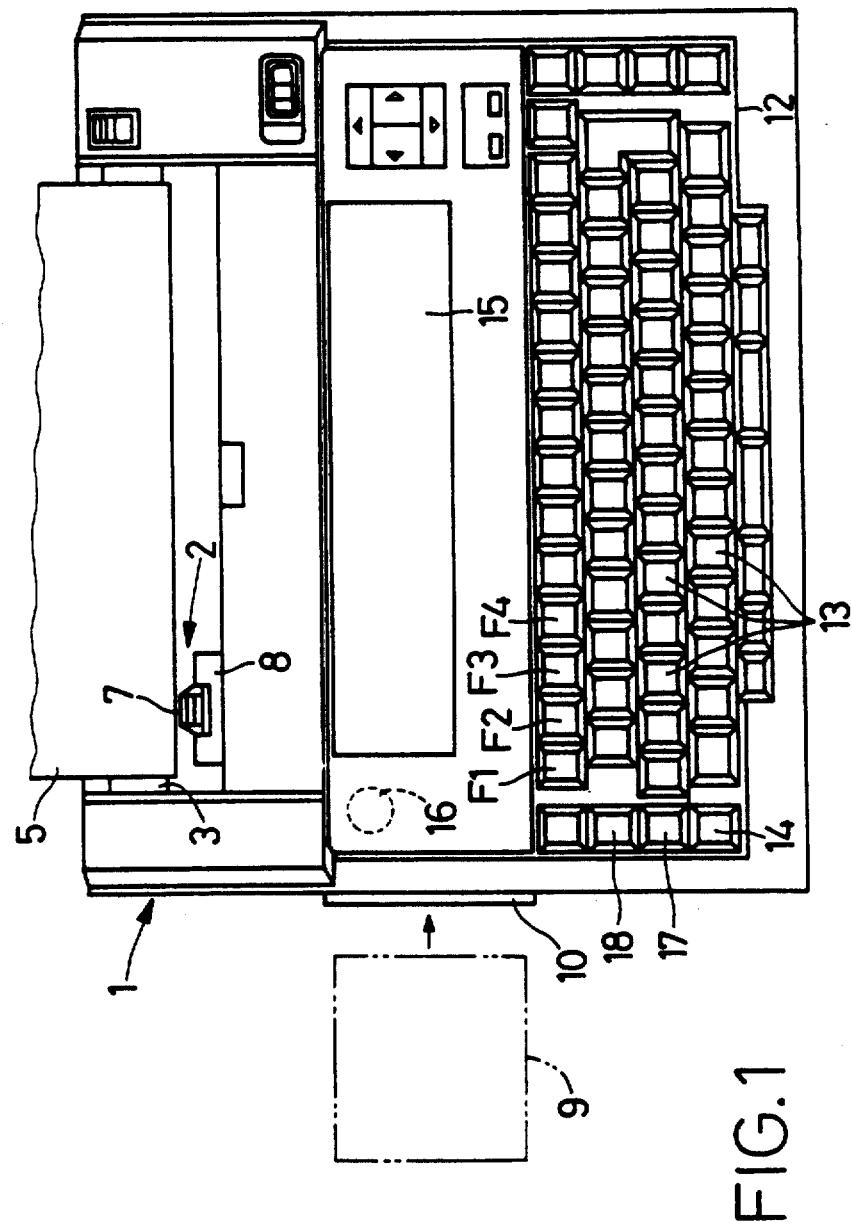
FIG. 1 is a plan view of a data processing apparatus incorporating one embodiment of a program processing system of the present invention.
Figure 2:
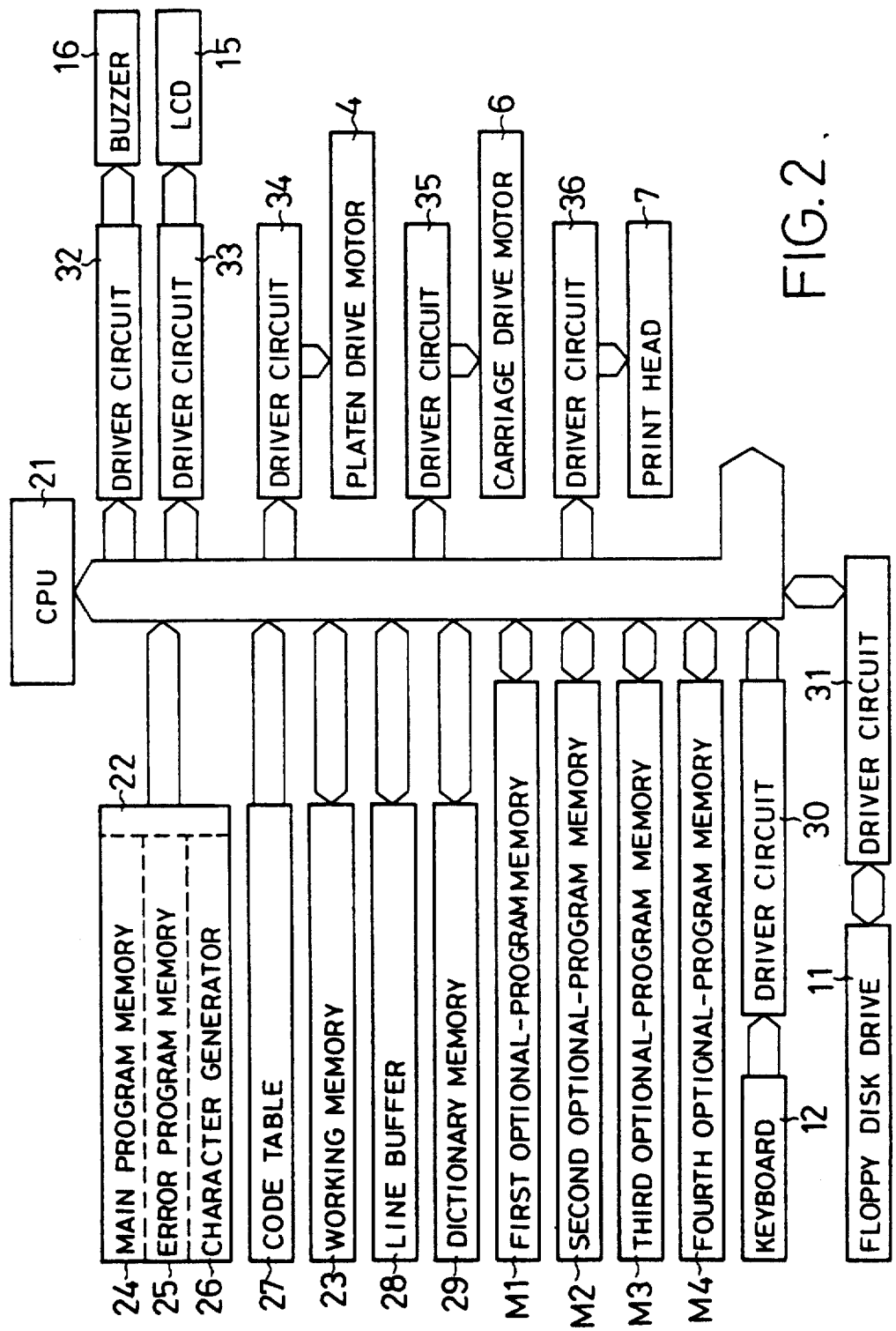
FIG. 2 is a schematic block diagram illustrating a control arrangement of the word processing apparatus of FIG. 1.

Referring to FIGS. 1-3, there will be described in detail one embodiment of the present invention, as applied to a portable word processor.

As shown in FIG. 1, the word processor incorporates a printer section 2 housed in a rear portion of a frame 1. The printer section 2 is provided with a platen 3 which is rotatably supported by the frame 1. I front of the platen 3, there is disposed a carriage (not shown) which is reciprocable in a direction parallel to the platen 3. The platen 3 is operatively connected to a platen drive motor 4 (FIG. 2), so that the platen 3 is rotated by the motor 4, to advance a recording sheet of paper 5 supported on the platen 3.

A pair of pulleys (not shown) are disposed near the right and left ends of the platen 3. One of the pulleys is connected to a carriage drive stepper motor 6 (FIG. 2). The two pulleys are connected by an endless wire (not shown), which is fixed to the carriage so that the carriage is reciprocated by the motor 6 via the pulleys and endless wire, as well known in the art.

The carriage carries a dot-matrix print head 7 mounted thereon. As is well known in the art, the dot-matrix print head 7 has a plurality of print wires which are selectively activated by electromagnetic means, to effect printing with a matrix of dots on the sheet of paper 5, via a print ribbon (not shown). The print ribbon is supplied from a ribbon cassette 8 also mounted on the carriage, such that an active or exposed length of the ribbon is passed between the platen 3 and the print head 7. As the carriage is moved, the print ribbon is fed and rewound by a take-up mechanism, which is well known in the art.

The word processor has a disk receptacle 10 which is open on one side wall of the frame 1. The disk receptacle 10 is adapted to accommodate a floppy disk 9 which stores various optional programs for performing the corresponding optional functions, such as word search function and spell-checking function. Inwardly of the disk receptacle 10, there is provided a floppy disk drive 11 (FIG. 2) which drives the disk 9 and reads the optional programs on the disk 9, for storing the programs into respective OPTIONAL-PROGRAM memories M1-M4 which will be described.

The word processor further includes a keyboard 12 in the front portion of the frame 1. The keyboard 12 has a large number of keys which include: a plurality of character keys 13 for entering text data such as character data representative of characters; a LOAD key 14 operated to load the word processor with the optional programs, from the floppy disk 9 through the floppy disk drive 11; a TRANSFER key 17 for transferring the text data from the word processor to a floppy disk through the disk drive 11; a PRINT key 18 for activating the printer section 2 to effect printing; and first, second, third and fourth OPTIONAL-FUNCTION keys F1, F2, F3 and F4, which are used to designate the optional programs stored in the optional-program memories M1-M4, respectively. Near the keyboard 12 is disposed a liquid crystal display (LCD) 15 which displays various kinds of information, such as text data entered through the character keys 13 and other keys. An alarm buzzer 16 is built in the frame 1, to inform the operator of an error or abnormal state of the word processor.

A control system of the instant word processor will be described, by reference to FIG. 2.

The control system includes control means in the form of a central processing unit (CPU) 21, a read-only memory (ROM) 22, and a working memory 23 constituted by a random-access memory (RAM). The ROM 22 and the working memory 23 are connected to the CPU 21.

The ROM 22 includes a MAIN PROGRAM memory 24 which stores a main control program for performing various data processing functions that are normally provided on an ordinary word processor. The ROM 22 further includes an ERROR PROGRAM memory 25 storing an alarming program for activating the buzzer 16, and a character generator 26 which stores pattern data representative of dot-matrix patterns of characters such as letters and symbols, of different fonts. The main control program and the alarming program which are stored in the MAIN PROGRAM and ERROR PROGRAM memories 24, 25 are referred to as "standard programs" for basic functions, as distinguished from the "optional programs" which are entered from the floppy disk 9 through the disk drive 11.

To the CPU 21 are also connected a CODE table 27 which stores character codes representative of characters, and a line buffer 28 which stores a set of text data which represents a line of characters to be printed on the sheet of paper 5. The text data consists of multiple sets of character data each representing a character. Each set of character data consists of 2 bytes (16 bits). The high-order byte is assigned to a character code indicative of the body of a character per se, while the low-order byte is assigned to attribute data representative of an underline or other attributes of characters.

There is also connected to the CPU 21 a dictionary memory 29 which stores "KANJI" (Chinese characters) data representative Chinese characters which are designated by Japanese "kana" letters (Japanese phonetic letters) entered through the character keys 13.

Also connected to the CPU 21 are the OPTIONAL-PROGRAM memories M1-M4 indicated above, which serve as optional-program memory means for storing first, second, third and fourth optional programs entered from the floppy disk 9 through the floppy disk drive 11. The OPTIONAL-PROGRAM memories M1, M2, M3 and M4 or the first, second, third and fourth optional programs stored therein are selected or designated by the respective first, second, third and fourth OPTIONAL-FUNCTION keys F1, F2, F3 and F4, as previously described.

The keyboard 12 and the floppy disk drive 11 are connected to the input side of the CPU 21, through respective driver circuits 30 and 31. Further, the buzzer 16, LCD 15, platen drive motor 4, carriage drive stepper motor 6 and print head 7 are connected to the output side of the CPU 21, through respective driver circuits 32, 33, 34, 35 and 36.

According to the main control program stored in the MAIN PROGRAM memory 24, the CPU 21 effects various control operations to perform the normal data processing functions, which include: storing text data entered through the character keys 13, into the line buffer 28 and working memory 23; controlling the printer section 2 according to the stored text data; and controlling the LCD 15 to display the stored text data. Described in more detail, the CPU 21 stores in the line buffer 28 a set of text data which represents a line of characters entered through the character keys 13, and displays the line of characters on the LCD 15. Further, sets of text data representative of successive lines of characters are stored in the working memory 23. Upon activation of the PRINT key 18 after the text data representative of a desired text of a document has been entered and stored in the working memory 23, the CPU 21 retrieves the text data from the working memory 23, and operates the print head 7 according to the retrieved text data, to print the appropriate lines of characters on the sheet of paper 5, via the print ribbon supplied from the ribbon cassette 8. To print each line of characters, the carriage is fed incrementally by the stepper motor 6, by an incremental distance which corresponds to each column-to-column distance of a predetermined dot matrix. After each line of characters is printed, the CPU 21 commands the platen drive motor 4 to rotate the platen 3, by a suitable angle to give a predetermined line spacing, i.e., to feed the sheet of paper 5 to the next line of printing.

When the LOAD key 14 is operated while the floppy disk 9 is set in the disk receptacle 10, the disk drive 11 is activated and set ready to store the optional programs from the disk 9 to the OPTIONAL-PROGRAM memories M1-M4. Upon subsequent activation of the appropriate OPTIONAL-FUNCTION key F1, F2, F3, F4, the corresponding optional program is stored in the appropriate OPTIONAL-PROGRAM memory M1, M2, M3, M4.

Upon activation of the selected one of the OPTIONAL-FUNCTION keys F1-F4, the CPU 21 retrieves the corresponding one of the optional programs from the appropriate one of the OPTIONAL-PROGRAM memories M1-M4, and effects the corresponding optional function, such as the word search function or spell-checking function.

When it is desired to transfer the stored text data from the working memory 23 to a suitable floppy disk (9), the floppy disk is set in the disk receptacle and the TRANSFER key 17 is operated. As a result, the CPU 21 activates the floppy disk drive 11 and thereby stores the text data into the floppy disk.

Referring next to the flow chart of FIG. 3, there will be described an operation of the instant word processor according to the standard program (main control program stored in the MAIN PROGRAM memory 24, and the alarming program stored in the ERROR PROGRAM memory 25).

Upon application of power to the word processor, the control flow starts with step S1 to effect initialization associated with the normal data processing functions, according to the main control program stored in the MAIN PROGRAM memory 24. Then, the control flow goes to step S2 in which the CPU 21 awaits data entry through the keyboard 12.

If any key on the keyboard 12 is operated, step S3 is executed to check whether the operated key is one of the character keys 13. If any character key 13 is operated, the control flow goes to step S4 wherein the character data corresponding to the operated character key 13 is stored in the line buffer 28 and the working memory 23. The CPU 21 then performs step S5 to display the entered character on the LCD 15 (which is capable of displaying one line of characters).

If the PRINT key 18 is operated after a given amount of text data is entered through the character keys 13, step S2 is followed by step S3, which is then followed by step S6, in which an affirmative decision is obtained. As a result, the control flow goes to step S7 in which the printer section 2 is controlled according to the text data stored in the working memory 23, whereby a text represented by the text data is printed on the sheet of paper 5.

When it is desired to store in the first OPTIONAL-PROGRAM memory M1 an optional program for a word search function, for example, the floppy disk 9 storing this optional program is inserted into the disk receptacle 10. In this condition, the LOAD key 14 is operated. As a result, the control flow goes to step S9 through steps S2, S3, S6 and S8. In step S9, the CPU 21 activates the floppy disk drive 11. Step S9 is followed by step S10 in which the CPU 21 determines whether any one of the OPTIONAL-FUNCTION keys F1-F4 is operated, or not. If the first OPTIONAL-FUNCTION key F1 is operated in this specific example, the control flow goes to step S11 in which the optional program for the word search function is retrieved from the floppy disk 9 and stored into the first OPTIONAL-PROGRAM memory M1 which corresponds to the operated first OPTIONAL-FUNCTION key F1.

When another optional program such as a spell-checking function is stored in the appropriate one of the other OPTIONAL-PROGRAM memories M2-M4, the floppy disk 9 storing this optional program is inserted in the disk receptacle 10, and the LOAD key 14 is operated. As a result, the control flow goes to step S9 through steps S2, S3, S6 and S8, whereby the floppy disk drive 11 is turned on, and step S10 is implemented to determine whether any one of the OPTIONAL-FUNCTION keys F1-F4 is operated. If the appropriate one of the keys F2-F4 is operated, the CPU 21 goes to step S11 wherein the relevant optional program is retrieved from the floppy disk 9 and stored in one of the OPTIONAL-PROGRAM memories M2-M4 which is designated by the operated OPTIONAL-FUNCTION key F2-F4. In this way, up to four optional programs may be stored in the respective four OPTIONAL-PROGRAM memories M1-M4.

If the first OPTIONAL-FUNCTION key F1 is operated to establish a word search mode of operation for finding a specified word in the text data stored in the working memory 23, the control flow goes to step S13 via steps S2, S3, S6, S8 and S12. In step S13, the CPU 21 determines whether the optional program for the word search function is stored in the first OPTIONAL-PROGRAM memory M1 designated by the operated first OPTIONAL-FUNCTION key F1, or not. In the present example wherein this optional program for the word search function has been stored in the first OPTIONAL-PROGRAM memory M1, step S13 is followed by step S14 wherein the optional program for the word search function is retrieved from the memory M1, whereby the word search mode is established according to the retrieved optional program.

In the word search mode, the text data stored in the working memory 23 is scanned to search for a word which has been designated by the character keys 13, as well known in the art.

If the character keys 13 are operated to enter character data after the word search mode of operation is completed, the control flow goes to step S4 via steps S2 and S3, whereby the entered character data is stored in the buffer memory 28 and the working memory 23, and is displayed on the LCD 15.

If the operator operates the fourth OPTIONAL-FUNCTION key F4 which corresponds to the fourth OPTIONAL-PROGRAM memory M4 in which no optional program has been stored in this specific example, the control flow goes to step S13 via steps S2, S3, S6, S8, S12, to determine whether an optional program is stored in the fourth OPTIONAL-PROGRAM memory M4. In the absence of any optional program in the memory M4, the control flow goes to step S16 in which the alarming program stored in the ERROR PROGRAM memory 25 as part of the standard program is retrieved and executed. Then, the CPU 21 executes step S17 in which the buzzer 16 is activated according to the retrieved alarming program, thereby alarming the operator of the absence of an optional program in the fourth OPTIONAL-PROGRAM memory M4.

If a key other than the keys 13, 14, 18 and F1-F4 is operated, the control flow goes to step S18 via steps S2, S3, S6, S8 and S12.

It follows from the foregoing description that the illustrated word processor is provided with the four OPTIONAL-PROGRAM memories M1-M4 which can be optionally loaded with four different optional programs, in addition to the standard main control program stored in the MAIN PROGRAM memory 24 and the standard alarming program stored in the ERROR PROGRAM memory 25. The optionally stored optional program or programs may be executed as if these optional programs were part of the standard program. In other words, the selected optional program may be implemented without terminating the control flow of the standard program. Thus, the instant word processor can be readily functionally expanded by the user, by storing the desired optional program or programs into the OPTIONAL-PROGRAM memories M1-M4 which are provided as a standard feature.

While the present invention has been described in its presently preferred embodiment, it is to be understood that the invention is not limited to the precise details of the illustrated embodiment but may be embodied with various changes, modifications and improvements which may occur to those skilled in the art, without departing from the spirit and scope of the invention defined in the appended claims. For instance, the main control program stored in the MAIN PROGRAM memory 24 may be modified such that the control flow returns to step S2, if a negative decision (NO) is obtained in step S13 (if the designated optional program is not stored in the appropriate OPTIONAL-PROGRAM memory M1-M4), as indicated in broken line in FIG. 3. Further, the numbers of the OPTIONAL-PROGRAM memories Mn and the OPTIONAL-FUNCTION keys Fn may be suitably selected.

While the illustrated embodiment is adapted such that the LOAD key 14 is first operated (in step S8) and then the OPTIONAL-FUNCTION key F1-F4 is operated (in step S10), these two keys 14, F1-F4 may be simultaneously operated so that the optional program corresponding to the operated OPTIONAL-FUNCTION key F1-F4 is stored into the corresponding OPTIONAL-PROGRAM memory M1-M4.

It will be obvious that the program processing system according to the principle of the present invention may be applied to an electronic typewriter, as well as the word processor which has been described above by way of example.

What is claimed is:

1. A program processing system, comprising:
    program input means for entering at least one optional program for performing an optional function;
    optional-program memory means for storing said at least one optional program entered through said program input means;
    commanding means for designating one of said at least one optional program, for execution of the designated optional program;
    standard-program memory means which stores a standard program for performing a basic function, said standard program including a step of determining whether said commanding means has been activated to designate said one of said at least one optional program, a step of determining whether the designated optional program is stored in said optional-program memory means, and a step of permitting said designated optional program to be executed if said designated optional program is stored in said optional-program memory means; and
    control means connected to said optional-program memory means, said standard-program memory means and said commanding means, for executing said standard program and said designated optional program stored in said optional-program memory means, said control means retrieving said designated optional program from said optional-program memory means, to perform the corresponding optional function, if said designated optional program is stored in said optional-program memory means, said control means skipping said step of permitting said designated optional program to be executed, if said designated optional program is not stored in said optional-program memory means.

2. A program processing system according to claim 1, wherein said standard program further includes a step of returning a control flow of said standard program to a state in which said control means awaits a next command, if said designated optional program is not stored in said optional program is not stored in said optional-program memory means.

3. A program processing system according to claim 1, wherein said optional-program memory means comprises a plurality of optional-program memories for storing a plurality of optional programs for different optional functions, and said commanding means comprises a plurality of key switches which are selectively operated to designate said plurality of optional programs, respectively.

4. An apparatus for preparing a text, comprising a program processing system according to claim 1, a keyboard having a multiplicity of character and function keys, a text memory for storing text data comprising character and function data entered through said keyboard, and display means for displaying said text data.

5. An apparatus according to claim 4, wherein said at least one optional program includes a program for searching for a designated group of characters in said text data stored in said text memory.

6. A program processing system, comprising:
program input means for entering at least one optional program for performing an optional function;
optional-program memory means for storing said at least one optional program entered through said program input means;
commanding means for designating one of said at least one optional program, for execution of the designated optional program;
standard-program memory means which stores a standard program for performing a basic function, said standard program including a step of determining whether said commanding means has been activated to designate said one of said at least one optional program, a step of determining whether the designated optional program is stored in said optional-program memory means, a step of permitting said designated optional program to be executed if said designated optional program is stored in said optional-program memory means, and a step of informing an operator of the system that said designated optional program is not stored in said optional-program memory means; and
control means connected to said optional-program memory means, said standard-program memory means and said commanding means, for executing said standard program and said designated optional program stored in said optional-program memory means, said control means retrieving said designated optional program from said optional-program memory means, to perform the corresponding optional function, if said designated optional program is stored in said optional-program memory means, said control means skipping said step of permitting said designated optional program to be executed and executing said step of informing an operator of the system that said designated optional program is not stored in said optional-program memory, if said designated optional program is not stored in said optional-program memory means.

7. A program processing system according to claim 6, further comprising a buzzer, and wherein said step of informing an operator of the system that said designated optional program is not stored in said optional-program memory means comprises activating said buzzer.

8. A program processing system according to claim 6, wherein said program input means comprises a disk drive for reading said at least one optional program stored on a storage disk.

9. A program processing system, comprising:
program input means including a disk drive operable with an optional-program storage disk, for entering at least one optional program for performing an optional function;
optional-program memory means for storing said at least one optional program entered through said program input means;
commanding means for designating one of said at least one optional program, for execution of the designated optional program;
standard-program memory means which stores a standard program for performing a basic function, said standard program including a step of permitting said at least one optional program to be stored in said optional-program memory means through said disk drive, a step of determining whether said commanding means has been activated to designate said one of said at least one optional program, a step of determining whether the designated optional program is stored in said optional-program memory means, and a step of permitting said designated optional program to be executed if said designated optional program is stored in said optional-program memory means; and
control means connected to said optional-program memory means, said standard-program memory means and said commanding means, for executing said standard program and said designated optional program stored in said optional-program memory means, said control means retrieving said designated optional program from said optional-program memory means, to perform the corresponding optional function, if said designated optional program is stored in said optional-program memory means, said control means skipping said step of permitting said designated optional program to be executed, if said designated optional program is not stored in said optional-program memory means.

* * * * *